(12) United States Patent
Petrou et al.

(10) Patent No.: US 9,262,780 B2
(45) Date of Patent: Feb. 16, 2016

(54) METHOD AND APPARATUS FOR ENABLING REAL-TIME PRODUCT AND VENDOR IDENTIFICATION

(75) Inventors: David Petrou, Brooklyn, NY (US); Hartwig Adam, Marina Del Rey, CA (US); Laura Garcia-Barrio, Brooklyn, NY (US); Hartmut Neven, Malibu, CA (US)

(73) Assignee: Google Inc., Mountain View, CA (US)

( * ) Notice: Subject to any disclaimer, the term of this patent is extended or adjusted under 35 U.S.C. 154(b) by 146 days.

(21) Appl. No.: 13/346,549

(22) Filed: Jan. 9, 2012

(65) Prior Publication Data

US 2013/0179303 A1 Jul. 11, 2013

(51) Int. Cl.
G06Q 30/00 (2012.01)
G06F 17/30 (2006.01)
G06Q 30/06 (2012.01)

(52) U.S. Cl.
CPC ............ *G06Q 30/0623* (2013.01); *G06Q 30/06* (2013.01)

(58) Field of Classification Search
CPC .................................................. G06Q 30/0623
USPC .................................................. 705/26.1–27.2
See application file for complete search history.

(56) References Cited

U.S. PATENT DOCUMENTS

| 6,690,516 | B2 | 2/2004 | Aritake et al. |
| 2002/0161645 | A1 | 10/2002 | Walker et al. |
| 2006/0248554 | A1 | 11/2006 | Priddy |
| 2007/0069030 | A1* | 3/2007 | Sauerwein et al. ...... 235/462.46 |
| 2009/0252371 | A1* | 10/2009 | Rao ............................... 382/100 |
| 2009/0271294 | A1* | 10/2009 | Hadi ............................... 705/27 |
| 2009/0319181 | A1* | 12/2009 | Khosravy et al. ............. 701/208 |
| 2010/0100233 | A1 | 4/2010 | Lu |
| 2010/0217685 | A1* | 8/2010 | Melcher et al. .................. 705/27 |
| 2010/0302143 | A1* | 12/2010 | Spivack ......................... 345/157 |
| 2010/0306825 | A1* | 12/2010 | Spivack ............................ 726/4 |
| 2011/0072015 | A1* | 3/2011 | Lin et al. ........................ 707/737 |
| 2011/0213664 | A1 | 9/2011 | Osterhout et al. |
| 2011/0245965 | A1 | 10/2011 | Farrell |
| 2012/0131094 | A1* | 5/2012 | Lyons et al. ................... 709/203 |
| 2012/0256967 | A1* | 10/2012 | Baldwin et al. ............... 345/684 |
| 2012/0271712 | A1* | 10/2012 | Katzin et al. ............... 705/14.51 |
| 2013/0024326 | A1* | 1/2013 | Dearing et al. ............ 705/26.61 |
| 2013/0050258 | A1* | 2/2013 | Liu et al. ....................... 345/633 |

OTHER PUBLICATIONS

Bodin, W. K. (1101). Free-space gesture recognition for transaction security and command processing Retrieved from http://search.proquest.com/docview/880684839?accountid=14753.*
PCT/US2012/064158; PCT International Search Report and Written Opinion of the International Searching Authority, mailed Mar. 29, 2013, 8 pages.
PCT/US2012/064158; PCT International Preliminary Report on Patentability, mailed Jul. 24, 2014, 7 pages.

* cited by examiner

*Primary Examiner* — Kathleen Palavecino
(74) *Attorney, Agent, or Firm* — Blakely Sokoloff Taylor & Zafman LLP

(57) ABSTRACT

A method and apparatus for enabling dynamic product and vendor identification and the display of relevant purchase information are described herein. According to embodiments of the invention, a recognition process is executed on sensor data captured via a mobile computing device to identify one or more items, and to identify at least one product associated with the one or more items. Product and vendor information for the at least one product is retrieved and displayed via the mobile computing device. In the event a user gesture is detected in response to displaying the product and vendor information data, processing logic may submit a purchase order for the product (e.g., for an online vendor) or contact the vendor (e.g., for an in-store vendor).

15 Claims, 11 Drawing Sheets

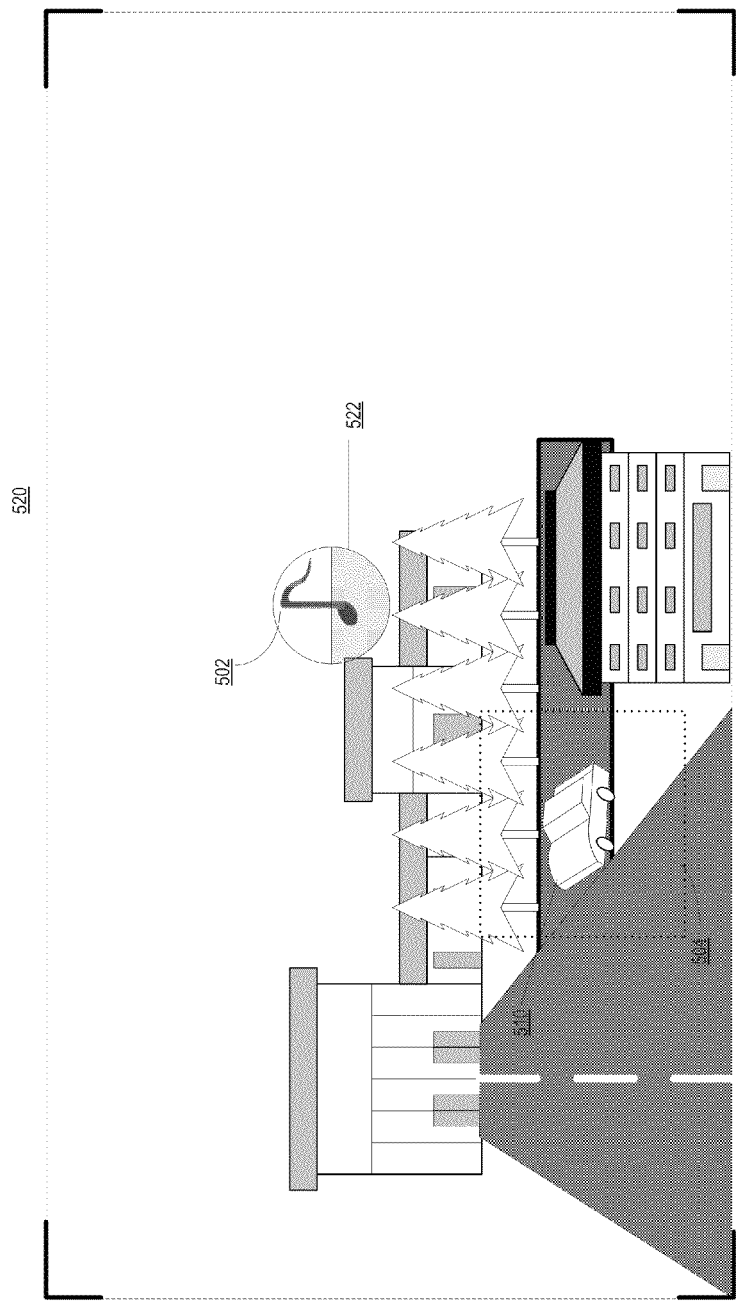

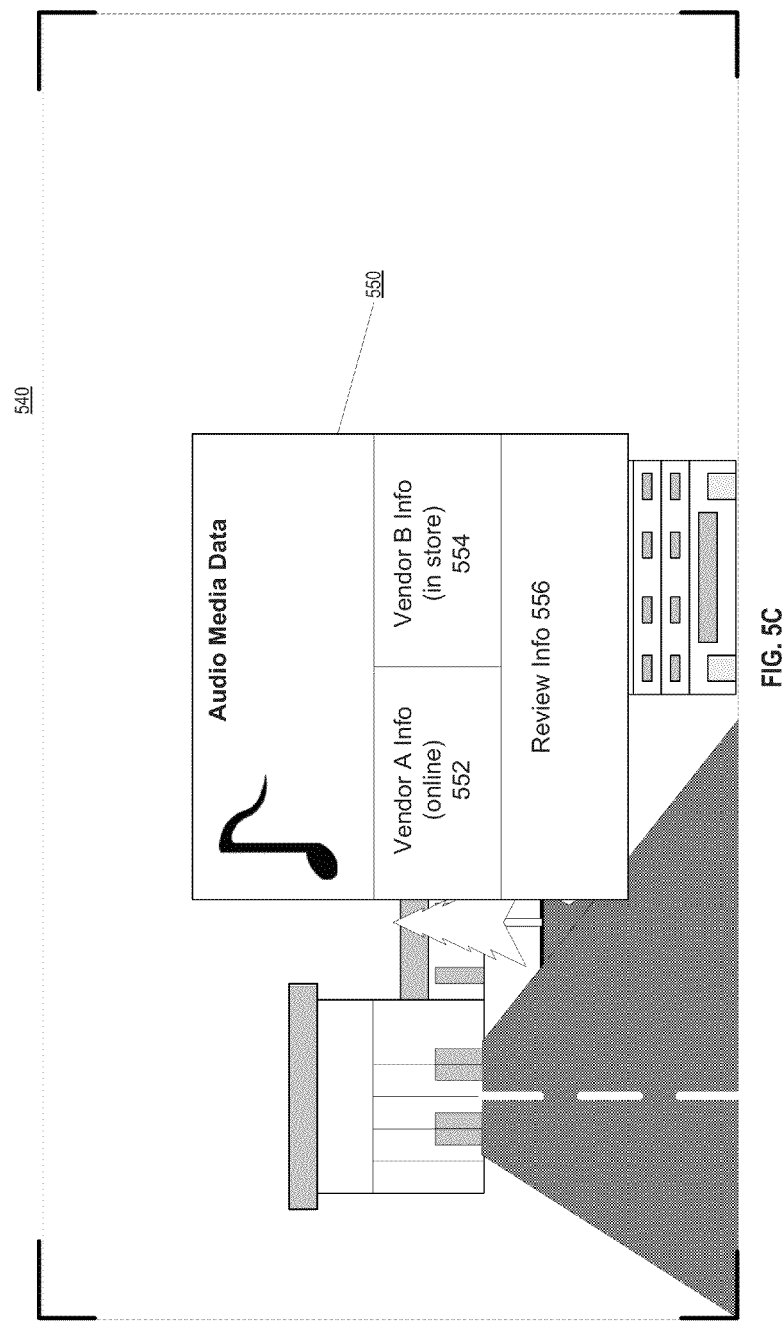

METHOD AND APPARATUS FOR ENABLING REAL-TIME PRODUCT AND VENDOR IDENTIFICATION

TECHNICAL FIELD

Embodiments of the invention relate to the field of mobile computing devices, and more particularly, to enabling real-time product and vendor identification.

BACKGROUND

A mobile computing device may include an image sensor (e.g., a camera) and/or an audio sensor (e.g., a microphone) to capture media data about people, places, and things a user of the mobile computing device encounters. When the user encounters an object, he may utilize the mobile computing device to obtain information about the object; however, he must typically enter a query to determine whether the object is a product for sale (if the object is encountered outside of a shopping context), an additional separate query for identifying both on-line and in-store vendors, and another separate query to obtain product review information. What is needed is a process for quickly and efficiently identifying product and vendor information for objects encountered by mobile computing device users.

SUMMARY

A method and apparatus for enabling dynamic product and vendor identification and the display of relevant purchase information are described herein. According to embodiments of the invention, a recognition process is executed on sensor data captured via a mobile computing device to identify one or more items, and to identify at least one product associated with the one or more items. Product and vendor information for the at least one product is retrieved and displayed via the mobile computing device. In the event a user gesture is detected in response to displaying the product and vendor information data, processing logic may submit a purchase order for the product (e.g., for an online vendor) or contact the vendor (e.g., for an in-store vendor).

These and other aspects and embodiments are described in detail in the drawings, the description, and the claims.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 5A-5C illustrate a live view augmented with product and vendor information according to an embodiment of the invention.

DETAILED DESCRIPTION

Embodiments of an apparatus, system and method for enabling dynamic product identification and the display of relevant purchase information are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
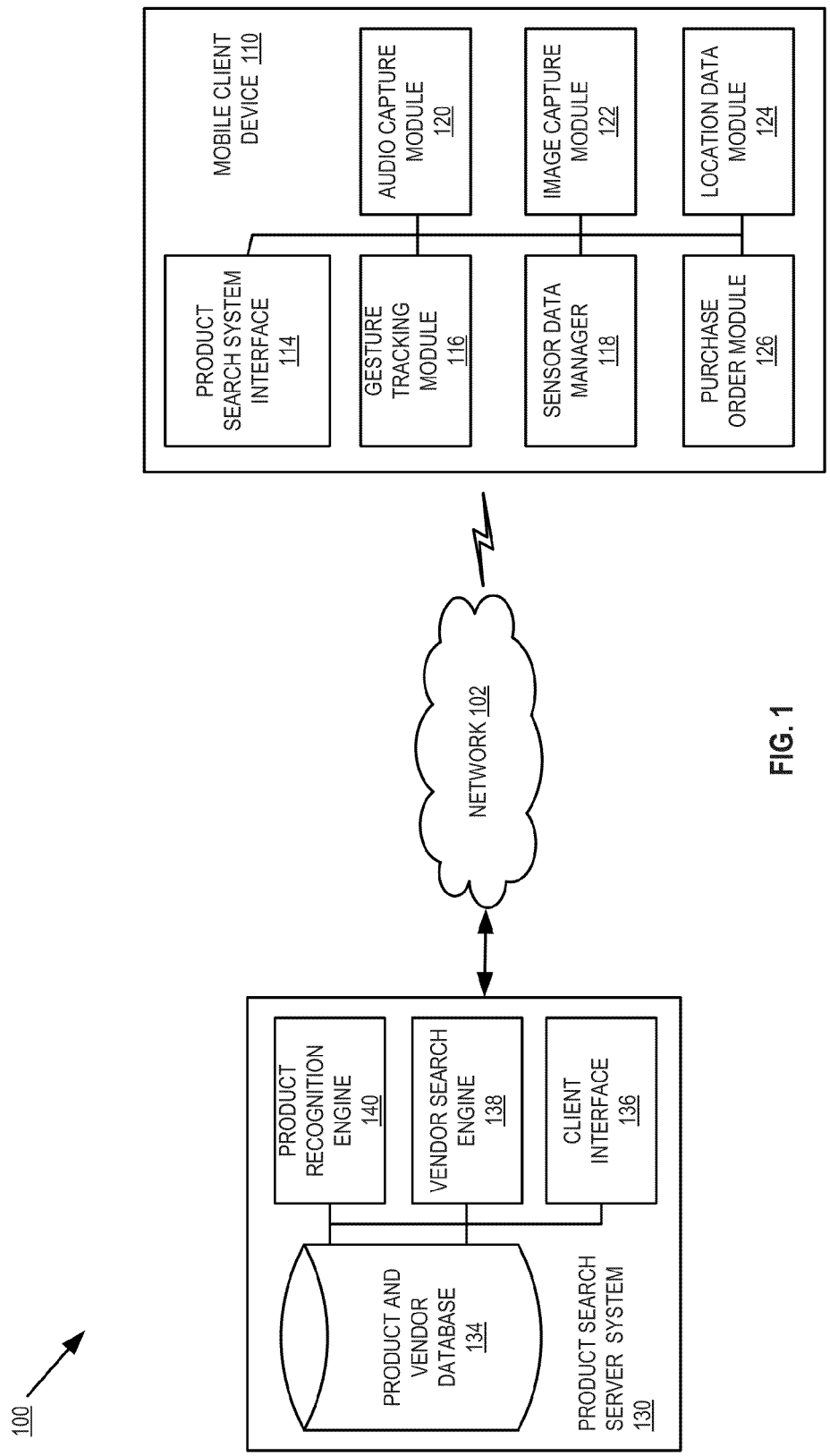
FIG. 1 is a block diagram of a system architecture for enabling dynamic product identification and the display of relevant purchase information for a mobile computing device according to an embodiment of the invention.

FIG. 1 is a block diagram of a system architecture for enabling dynamic product identification and the display of relevant purchase information for a mobile computing device according to an embodiment of the invention. System 100 includes mobile client device 110 and product search server system 130. Mobile client device 110 may be a mobile computing device, such as a mobile telephone, personal digital assistant, tablet computer, wearable computing device, etc. Product search server system 130 may also be a computing device, such as one or more server computers, desktop computers, etc.

Mobile client device 110 and product search server system 130 may be communicatively coupled via network 102 using any of the standard network protocols for the exchange of information. In one embodiment, mobile client device 110 is coupled with network 102 via a wireless connection, such as a cellular telephone connection, wireless fidelity connection, etc. Mobile client device 110 and product search server system 130 may run on one Local Area Network (LAN) and may be incorporated into the same physical or logical system, or different physical or logical systems. Alternatively, mobile client device 110 and product search server system 130 may reside on different LANs, wide area networks, cellular telephone networks, etc. that may be coupled together via the Internet but separated by firewalls, routers, and/or other network devices. It should be noted that various other network configurations can be used including, for example, hosted configurations, distributed configurations, centralized configurations, etc.

In this embodiment, mobile client device 110 is able to capture digital image data with a digital camera (not shown) and capture audio data with a microphone (not shown) included in the mobile device. The captured digital image data may include still digital photographs, a series of digital photographs, recorded digital video, a live video feed, etc.

Figure 3A:
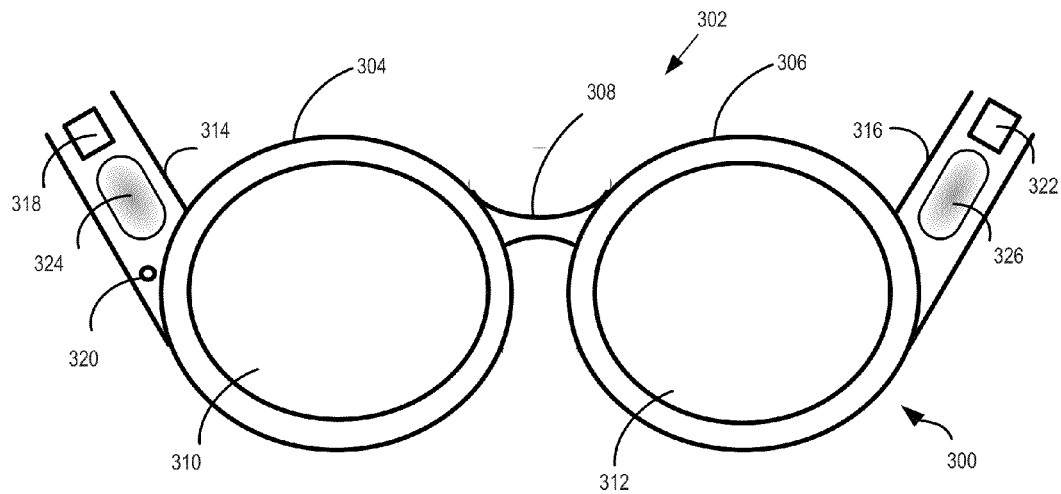
FIGS. 3A and 3B illustrate an example system for capturing media data and displaying product and vendor information according to an embodiment of the invention.
Figure 3B:
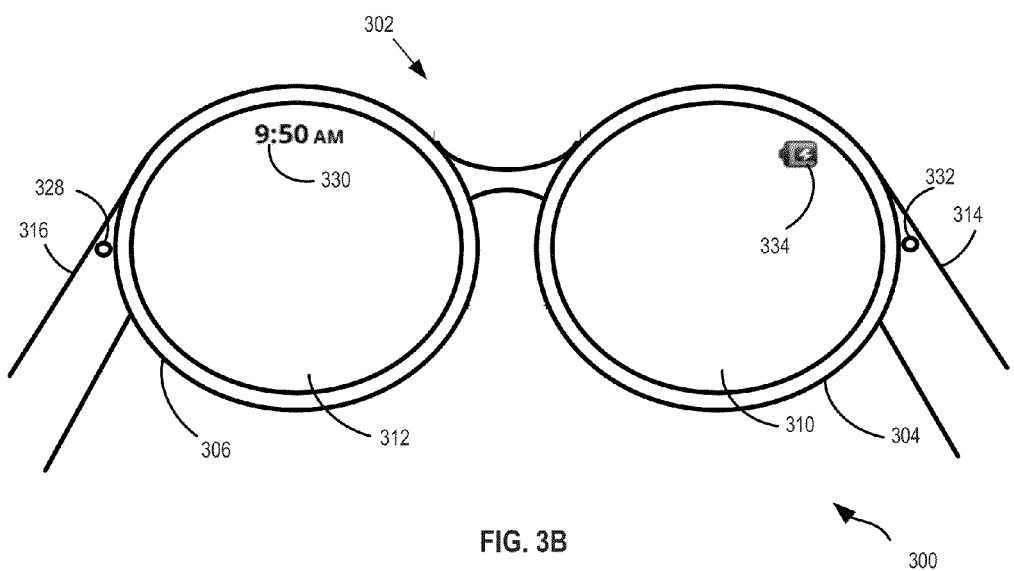

The captured audio data may include audio samples, audio signatures, audio data associated with recorded video data, a live audio feed, etc. Mobile client device 110 may be implemented as a binocular wearable computing device (as illustrated in FIGS. 3A and 3B), a monocular wearable computing device (i.e., a single eye head mounted display similar to those described in FIGS. 3A and 3B), as well as a cellular telephone, a tablet computer, or otherwise.

In this embodiment, mobile client device 110 includes product search system interface 114, gesture tracking module 116, sensor data manager 118, audio capture module 120, image capture module 122, location data module 124, and purchase order module 126. Product search server system 130 may include product and vendor database 134, client interface 136, vendor search engine 138, and product recognition engine 140.

Sensor data manager 118 may receive sensor data from any of audio capture module 120, image capture module 122, and location data module 124. Audio capture module 120 captures digital audio data including music, audio media that conveys data such as product names, places, and news events, etc. Image capture module 122 captures digital image data of objects, people, places or things, etc. Location data module 124 captures location data (captured, for example, from a Global Positioning System (GPS) or via Cell Tower triangulation) that identifies the location of mobile client device 110. In one embodiment, sensor data manager 118 generates digital signatures for objects within image data captured by image capture module 122 and/or selects audio samples or generates digital signatures from audio data captured by audio capture module 120; this data is combined with location data captured from location data module 124 and then transmitted by product search system interface 114 to client interface 136 of product search server system 130.

When media data (i.e., digital image data and/or digital audio data) captured by mobile client device 110 is received by product search server system 130, product recognition engine 140 identifies products from the media data captured by sensor data manager 118. For example, product recognition engine 140 may analyze received sensor data to determine if audio or image data related to a product has been captured (e.g., an audio/visual advertisement, an audio signature of a song, a bar code, an image of a product, an image of a known mark, etc.).

If one or more products were successfully indentified from the media data, vendor search engine 138 further identifies product vendor information to send to the user of the mobile client device; said vendor information may identify online vendors and/or vendors proximate to the location of mobile client device 110 (i.e., based on location data received from location data module 124). In this embodiment, vendor search engine 138 and product recognition engine 140 are shown to access product and vendor database 134 included in product search server system 130; in other embodiments, said database may be included in a server system operatively coupled to a separate server system including the vendor search engine and the product recognition engine.

Thus, mobile client device 110 captures media data and transmits it to product search server system 130 to determine whether the user of the mobile client device has encountered one or more products. In one embodiment, sensor data manager 118 enables a user to define events that trigger the capture and transmission of media data, e.g., a designated time period or location, upon encountering a place or object of interest, etc. Sensor data manager 130 may further enable a user to set location based preferences where media data is to be captured. For example, when mobile client device 110 is located at a location known to have products of interest (e.g., a shopping mall), the mobile client device may be set to continuously, or at regular periodic intervals, capture media data without the user initiating the media capture. Thus, embodiments of the invention do not require the user to explicitly submit a query to obtain product and vendor information of an object the user encounters.

When client interface 136 of product search server system 130 receives digital image data and/or audio data, said interface may generate digital signatures for objects within the received image data and audio samples from the received audio data. However, as discussed above, client interface 136 may also receive image signatures and audio samples, and thus may not generate the signatures and samples. In one embodiment, client interface 136 utilizes the digital image signatures and/or audio samples to perform one or more recognition processes on the media data to attempt to determine specific objects, things, graphics, advertisements, etc. within digital image data, or determine words, a song title, product names, etc., within audio data. Product recognition engine 140 and vendor search engine 138 may utilize the image signatures and/or audio samples to search product and vendor database 134.

In this embodiment, in response to identifying products and vendors from captured media data as discussed above, client interface 136 transmits display data to product search server interface 114 of mobile client device 110 for displaying purchase information (i.e., product and vendor information) for the indentified products. In one embodiment, said data is formatted for augmenting a live view of the user of the mobile client device, so that the relevant product and vendor data is displayed proximate to the actual product in the live view.

In this embodiment, gesture tracking module 116 detects whether the user has executed a gesture indicating a desire to purchase the product from the vendor (or one of the vendors) displayed within the live view. Said user gesture may include, for example, utilization of an I/O device, movement of mobile client device 110 (e.g., motion detected via an accelerometer), or eye tracking information as described below with respect to the example embodiment illustrated in FIGS. 3A and 3B. Upon detecting the user gesture, a purchase order may be transmitted to the appropriate vendor from the mobile client device via purchase order module 126.

Figure 2:
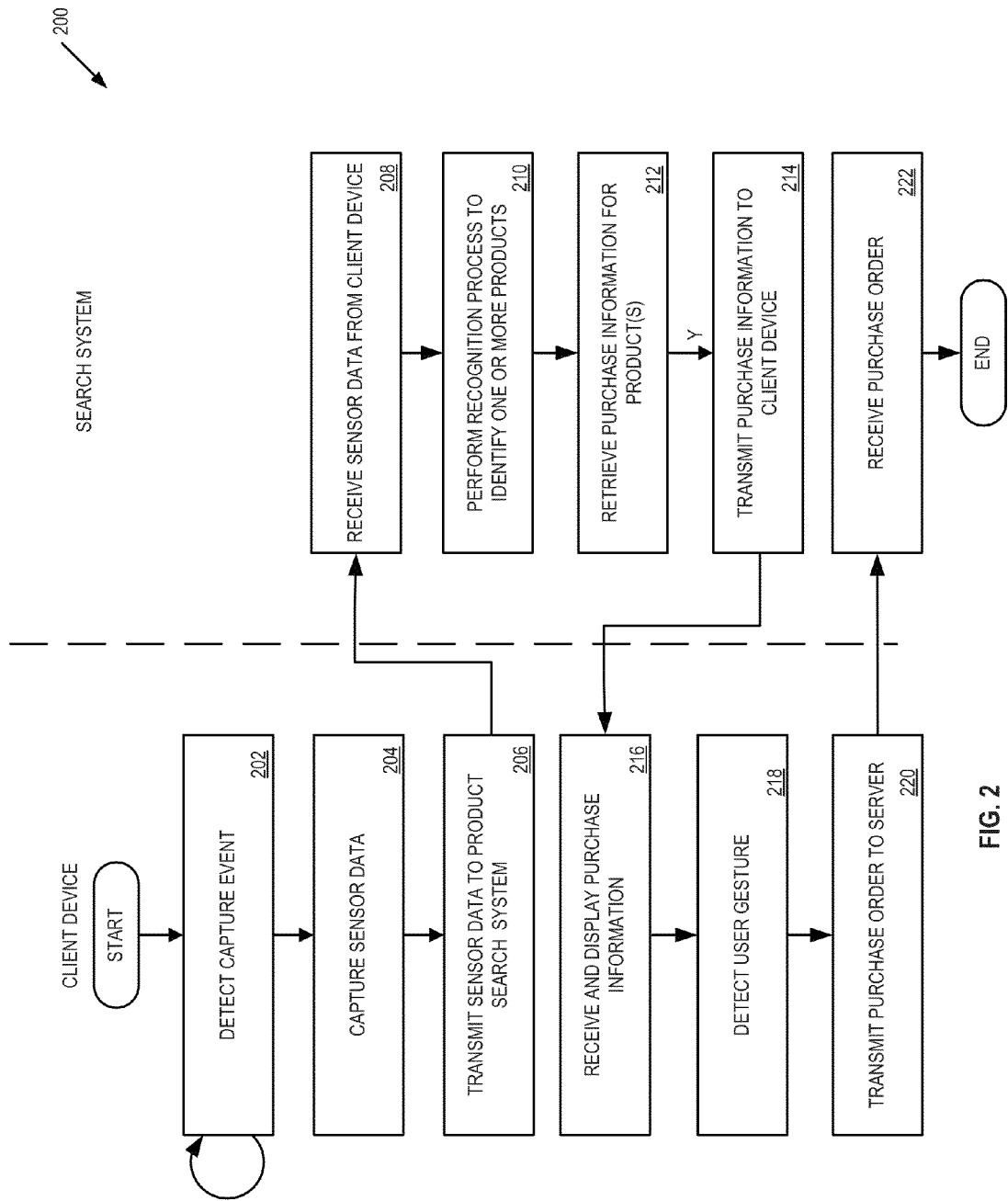
FIG. 2 is a flow diagram of a process for identifying one or more products from captured media data according to an embodiment of the invention.

FIG. 2 is a flow diagram of a process for identifying one or more products from captured media data according to an embodiment of the invention. Flow diagrams as illustrated herein provide examples of sequences of various process actions. Although shown in a particular sequence or order, unless otherwise specified, the order of the actions can be modified. Thus, the illustrated implementations should be understood only as examples, and the illustrated processes can be performed in a different order, and some actions may be performed in parallel. Additionally, one or more actions can be omitted in various embodiments of the invention; thus, not all actions are required in every implementation. Other process flows are possible.

Process 200 is performed by processing logic that may comprise hardware (circuitry, dedicated logic, etc.), software (such as is run on a general purpose computer system or a dedicated machine), firmware, or a combination. Process 200 may be performed by a client and server device (e.g., mobile client device 110 and product search server system 130 of FIG. 1).

A client device determines if one or more sensor capture events has occurred (processing block 202). Said one or more sensor capture events may comprise a user initiated command to capture data, an event defined by the user such as a location or time based event, etc. In response to determining that a capture event has occurred, the client device captures sensor data (processing block 204). Said sensor data may include video data, pictures, audio data, location data, etc.

Processing logic transmits the captured sensor data to a product search system (processing block 206). In one embodiment, processing logic generates digital signatures of objects within digital image data, and selects audio samples from digital audio data, which are transmitted to the product search system.

Processing logic receives the captured sensor data from the client device (processing block 208). In one embodiment, where processing logic receives media data and not image signatures and/or audio samples, processing logic generates the digital signatures for the objects within the received digital image data, and selects audio samples from received digital audio data. Processing logic performs image and/or audio recognition on the sensor data to identify one or more products (processing block 210). In one embodiment, processing logic utilizes the digital image signatures to search for real world objects, advertisements, graphics or known marks with matching image signatures. Furthermore, processing logic utilizes samples of audio to search for audio, such as songs, product names, etc., that match the audio samples.

Processing logic then retrieves purchase information for the indentified products (processing block 212). Said purchase information may include data indentifying one or more vendors proximate to the location of the client device, and/or information identifying an online vendor and including information for accessing said online vendor via a network (e.g., a hyperlink). In one embodiment, each transfer of sensor data from the client device is accompanied by user identification data, such as a user name and password, unique identification data associated with the user, etc.; thus, processing logic may use said user identification data for accessing a user related account for purchasing said product.

The above described purchase information (i.e., data indentifying the product and its vendors) is transmitted to the client device (processing block 214). The client device receives and displays said purchase information (processing block 216). During the display of said purchase information, processing logic determines whether the user committed a gesture indicating a request to purchase the product (processing block 218). Said user gesture may include, for example, utilization of an I/O device (e.g., a mouse, a touch-screen, a touch pad), movement of the client device (e.g., motion detected via an accelerometer), an audible user command, or eye tracking information directed towards the displayed information as described below. In the event the user gesture is detected, a purchase order is transmitted to the server system (processing block 220). Once the purchase order is received, the product is purchased using the above described user identification data (processing block 222).

FIGS. 3A and 3B illustrate an example system for capturing media data and displaying product and vendor information according to an embodiment of the invention. System 300 is shown in the form of a wearable computing device. While illustrated as eyeglasses 302, other types of wearable computing devices could additionally or alternatively be used, such as a monocular wearable computing device with a single eye head mounted display. Eyeglasses 302 comprise frame elements including lens-frames 304 and 306 and center frame support 308, lens elements 310 and 312, and extending side-arms 314 and 316. Center frame support 308 and extending side-arms 314 and 316 are configured to secure eyeglasses 302 to a user's face via a user's nose and ears, respectively.

Each of frame elements 304, 306, and 308 and extending side-arms 314 and 316 may be formed of a solid structure of plastic or metal, or may be formed of a hollow structure of similar material so as to allow wiring and component interconnects to be internally routed through eyeglasses 302. Each of lens elements 310 and 312 may be formed of any material that can suitably display a projected image or graphic related to the above describe purchase and vendor information. Each of lens elements 310 and 312 may also be sufficiently transparent to allow a user to see through the lens element. Combining these two features of the lens elements can facilitate an augmented reality or heads-up display where the projected image or graphic is superimposed over a real-world view as perceived by the user through the lens elements.

Extending side-arms 314 and 316 are each projections that extend away from frame elements 304 and 306, respectively, and are positioned behind a user's ears to secure eyeglasses 302 to the user. Extending side-arms 314 and 316 may further secure eyeglasses 302 to the user by extending around a rear portion of the user's head. Additionally or alternatively, for example, system 300 may connect to or be affixed within a head-mounted helmet structure. Other possibilities exist as well.

System 300 may also include on-board computing system 318, video camera 320, sensor 322, and finger-operable touch pads 324, 326. On-board computing system 318 is shown to be positioned on extending side-arm 314 of eyeglasses 302; however, on-board computing system 318 may be provided on other parts of eyeglasses 302. On-board computing system 318 may include a processor and memory, for example. On-board computing system 318 is configured to receive and analyze data from video camera 320 and finger-operable touch pads 324, 326 (and possibly from other sensory devices, user interfaces, or both) and generate images for output from lens elements 310 and 312.

Video camera 320 is shown to be positioned on extending side-arm 314 of eyeglasses 302; however, video camera 320 may be provided on other parts of eyeglasses 302. Video camera 320 may be configured to capture images at various resolutions or at different frame rates based on media data capture events, as described above. Many video cameras with a small form-factor, such as those used in cell phones or webcams, for example, may be incorporated into an example of system 300. Although FIG. 3A illustrates one video camera, more video cameras may be used, and each may be configured to capture the same view, or to capture different views. For example, video camera 320 may be forward facing to capture at least a portion of the real-world view perceived by the user. This forward facing image captured by video camera 320 may then be used to generate an augmented reality where computer generated images appear to interact with the real-world view perceived by the user.

Sensor 322 is shown mounted on extending side-arm 316 of eyeglasses 302; however, sensor 322 may be provided on other parts of eyeglasses 302. Sensor 322 may include one or more of a gyroscope or an accelerometer, for example. Other sensing devices may be included within sensor 322 or other sensing functions may be performed by sensor 322.

Finger-operable touch pads 324, 326 are shown mounted on extending side-arms 314, 316 of eyeglasses 302. Each of finger-operable touch pads 324, 326 may be used by a user to input commands. Finger-operable touch pads 324, 326 may sense at least one of a position and a movement of a finger via capacitive sensing, resistance sensing, or a surface acoustic wave process, among other possibilities. Finger-operable touch pads 324, 326 may be capable of sensing finger movement in a direction parallel or planar to the pad surface, in a direction normal to the pad surface, or both, and may also be capable of sensing a level of pressure applied. Finger-operable touch pads 324, 326 may be formed of one or more translucent or transparent insulating layers and one or more translucent or transparent conducting layers. Edges of finger-operable touch pads 324, 326 may be formed to have a raised, indented, or roughened surface, so as to provide tactile feedback to a user when the user's finger reaches the edge of finger-operable touch pads 324, 326. Each of finger-operable touch pads 324, 326 may be operated independently, and may provide a different function.

System 300 may further include sensors to acquire eye image (e.g., video images) of the user's eye. These eye images are to detect user eye movements (e.g., eye muscle movements, such as a wink), and are analyzed to generate gaze direction information, which can be used to determine the user's gazing direction—i.e., "lock on" and track an item the user is currently gazing or staring. The gaze direction information can be correlated to the scene images acquired by video camera 320 to determine what item the user is looking at when viewing the external scene and augmented content via lens elements 310 and 312.

FIG. 3B illustrates an alternate view of the system 300. Eyeglasses 302 may include projector 328 coupled to an inside surface of extending side-arm 316 and configured to project display 330 onto an inside surface of lens element 312. Additionally or alternatively, a projector may be coupled to an inside surface of extending side-arm 314 and configured to project display 334 onto an inside surface of lens element 310.

Lens elements 310 and 312 may act as a combiner in a light projection system and may include a coating that reflects the light projected onto them from projectors 328 and 332. In some embodiments, a special coating may not be used (e.g., when projectors 328 and 332 are scanning laser devices).

In alternative embodiments, other types of display elements may also be used. For example, lens elements 310, 312 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within frame elements 304 and 306 for driving such a matrix display. Alternatively or additionally, a laser or LED source and scanning system could be used to draw a raster display directly onto the retina of one or more of the user's eyes. Other possibilities exist as well.

Figure 4A:
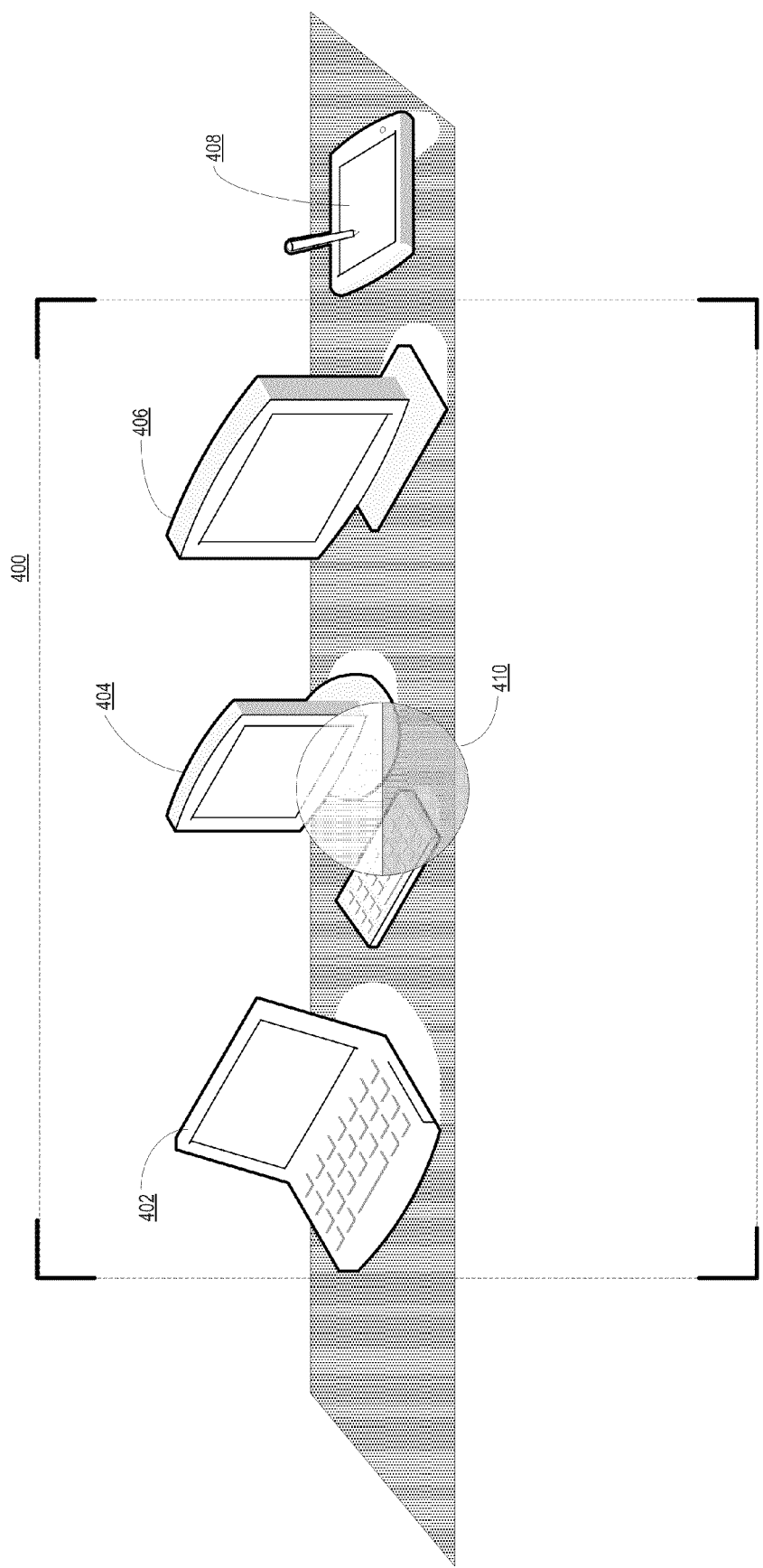
FIG. 4A-4C illustrate a live view augmented with product and vendor information according to an embodiment of the invention.
Figure 4B:
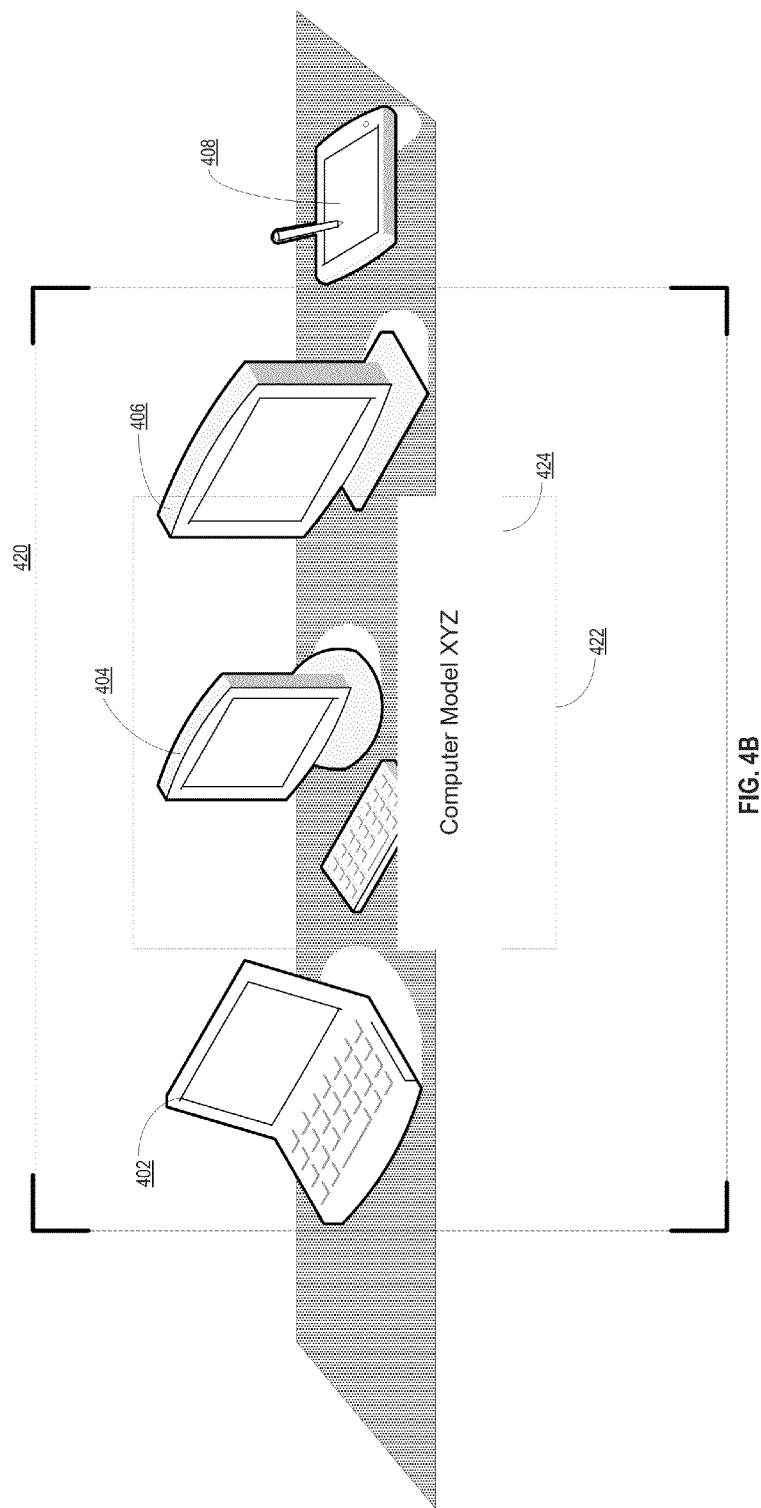
Figure 4C:
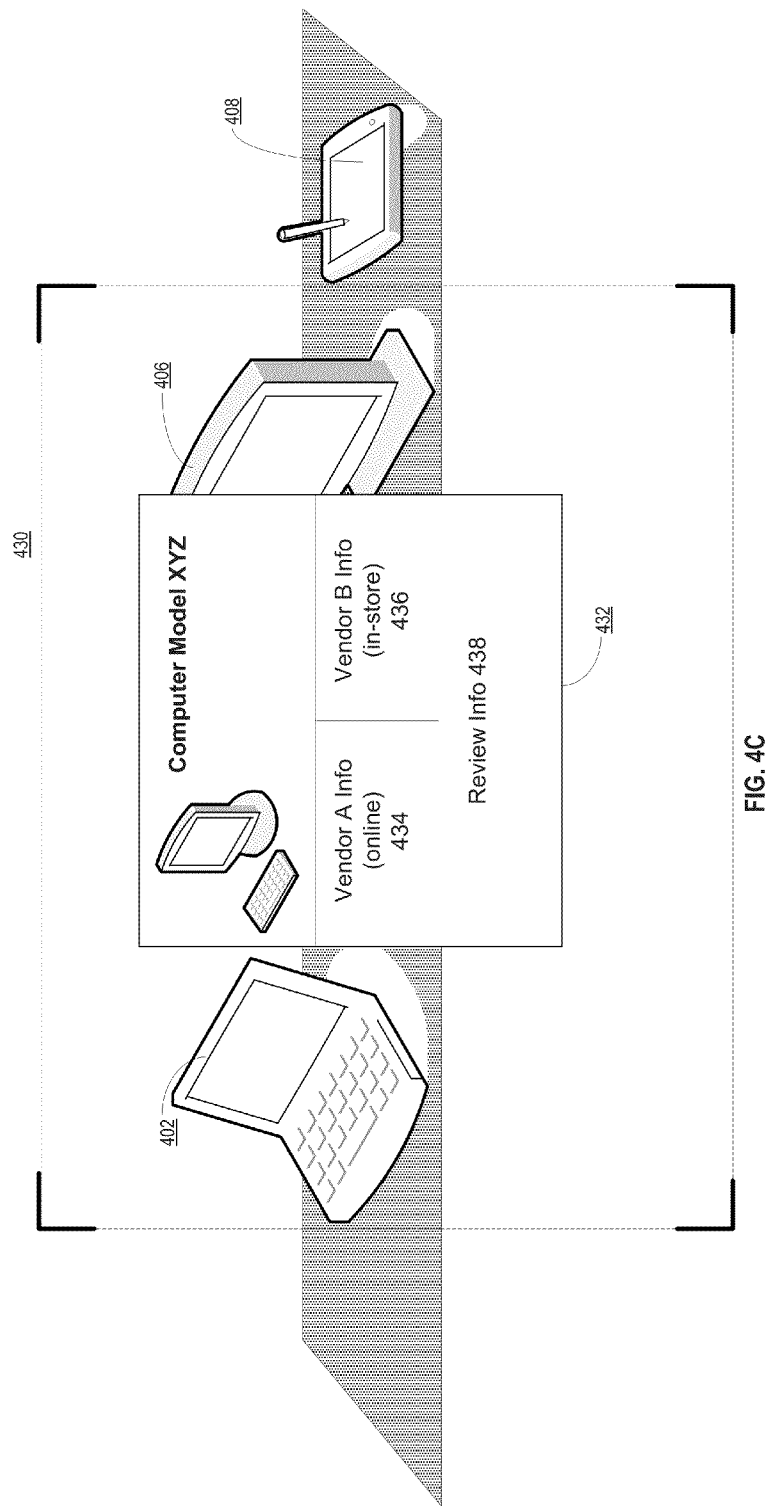

FIG. 4A-4C illustrate a live view augmented with product and vendor information according to an embodiment of the invention. In this example, view 400 represents a mobile computing device's live view of computer products 402, 404 and 406; computer product 408 is shown to be outside of the device's view. View 400 may be displayed, for example, via user wearable portable computing device (e.g., the devices illustrated in FIGS. 3A and 3B) on a transparent or semi-transparent matrix display, such as an electroluminescent display or liquid crystal display, one or more waveguides for delivering an image to the user's eyes, or other optical elements capable of delivering an in focus near-to-eye image to the user.

Scene image data of view 400 may be transmitted to a product search server system to identify one or more products within the view. In one embodiment, scene image data of view 400 is a single frame of a continuous video steam of scene images. The scene images may be captured using a variety of different standardized imaging codecs (e.g., MPEG, MPEG-4, series of JPEG images, etc.), or a proprietary imaging protocol. The scene image may be an image of anything viewed by the user and thus may include a plurality of items. The scene images may be acquired continuously in real-time recording everything viewed by the user. Product and vendor information is generated for one or more of the identified objects. In this embodiment, computer product 404 is chosen as it is closest to center 410 of view 400. In other embodiments, product and vendor information is generated for all identifiable objects.

FIG. 4B illustrates product information according to an embodiment of the invention. In this example, live view 420 is augmented with display window 422; said display window forms a thin visual border around computer product 404 to indicate that it has been identified. In this embodiment, said display window includes identification data 424 displaying product information relevant to computer product 404.

In this embodiment, additional product and vendor information may be displayed if a user gesture is detected with respect to identification data 424. In embodiments utilizing the computer wearable device illustrated in FIGS. 3A and 3B, said user gesture may be a head-nod (detected via an accelerometer) prolonged stare, eye-wink or gaze at the displayed identification data. In other embodiments, equivalent user gestures such as audible user commands or I/O device commands (e.g., cursor point and click gestures, touch-screen gestures) may result in more product and vendor information to be displayed.

FIG. 4C illustrates the display of more detailed product and vendor information according to an embodiment of the invention. The illustrated purchase information may be displayed in lieu of display window 422 of FIG. 4B, or in response to a user gesture with respect to identification data 424 (e.g., the above described eye gestures).

In this example, display information 432 is displayed within live view 430 for indentifying more detailed product and vendor information for computer product 406. Said display information includes vendor information windows 434 and 436, which in this example includes different types of vendors; vendor info 434 displays online vendor information and vendor info 436 displays information of a vendor within a proximate location of the user. In some embodiments, user gestures directed towards vendor info 434 and 436 trigger an action related to the type of vendor info displayed. For example, a user gesture toward vendor info 434 may trigger an online purchase of computer product 406, while a user gesture toward vendor info 436 may trigger an in-store purchase of the computer product, directions to the vendor's location, a phone call to the vendor, etc.

Display window 432 further includes review information 438 to display review information relevant to computer product 406. Said review information may be based on information accessible via the web, reviews from contacts of the user (accessible, for example, via a social networking interface), etc. Said review information may be displayed a summary of the reviews (e.g., an aggregate rating value), allowing the user to view more detailed review information accessible via a gesture directed towards the displayed review information.

Figure 5A:
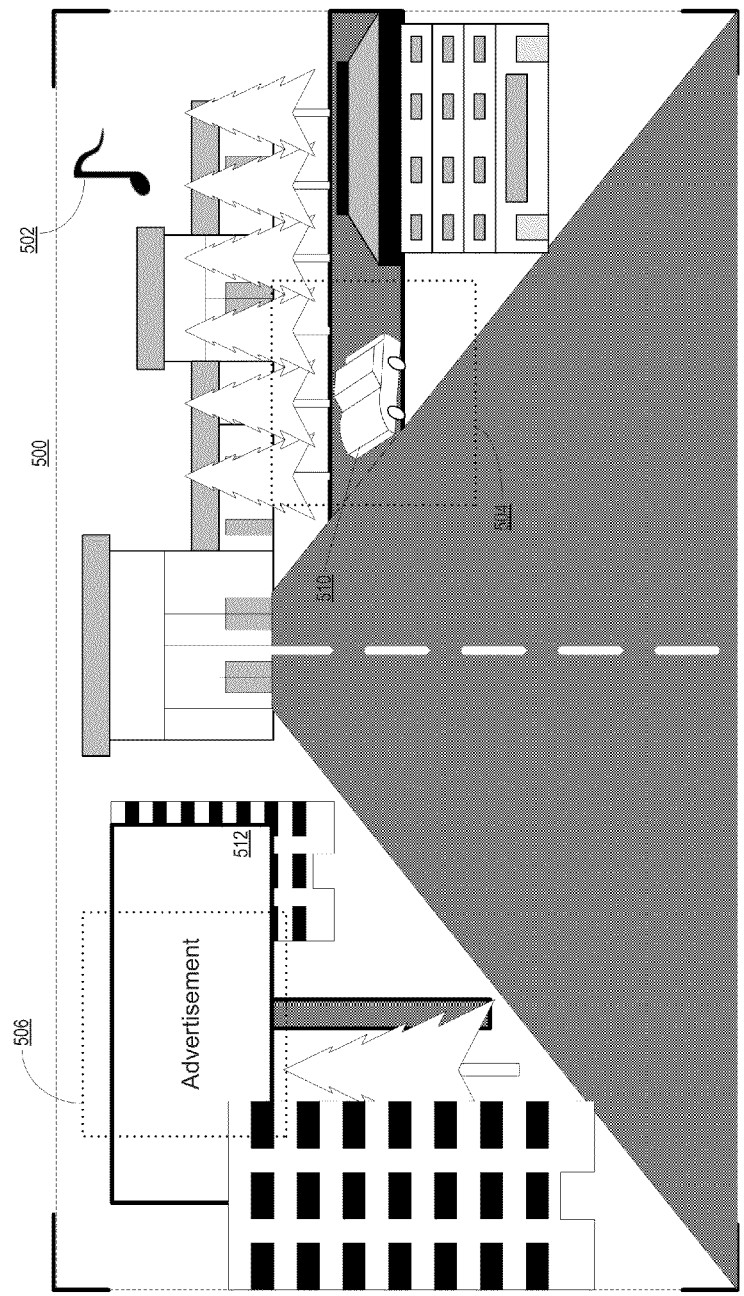

FIG. 5A-5C illustrate a live view augmented with product and vendor information according to an embodiment of the invention. In this example, view 500 of FIG. 5A represents a mobile computing device's live view of an external scene that includes a view of advertisement 512 and automobile 510. In this embodiment, live view 500 is augmented with display window 506 overlaid over advertisement 512; said display window forms a thin visual border around said advertisement to indicate that product information related to the advertisement has been identified. Display window 504 is similarly overlaid over automobile 510 to indicate that product information related to the automobile has been identified.

In this example, mobile computing device has captured audio data related to an audio media product (e.g., a downloadable song). The recognition of said audio media product is displayed within live view 500 by augmented icon 502.

In this embodiment, product information is displayed whenever an identifiable product is in the center of the live view of the mobile computing device. FIG. 5B illustrates the user moving the mobile computing device (e.g., turning his head or moving his eyes if the mobile computing device is a user wearable portable computing device as shown in FIGS. 3A and 3B) such that icon 502 is placed in the center of view 520 (shown as area 522).

In this embodiment, as a result of icon 502 being in the center of the live view of the mobile computing device, product and vendor information 550 is displayed within view 540, as shown in FIG. 5C. Said display information includes vendor information windows 552 and 554, which in this example includes different types of vendors; vendor info 552 displays online vendor information and vendor info 554 displays information of a vendor within a proximate location of the user. Similar to the embodiments discussed above, a user gesture toward vendor info 552 may trigger an online purchase of the audio media data, while a user gesture toward vendor info 554 may trigger directions to the vendor's location, a phone call to the vendor, etc.

Display window 550 further includes review information 556 to display review information relevant to the audio media data. Said review information may be based on information accessible via the web, reviews from contacts of the user (accessible, for example, via a social networking interface), etc. Said review information may be displayed a summary of the reviews (e.g., an aggregate rating value), allowing the user to view more detailed review information accessible via a gesture directed towards the displayed review information.

Figure 6:
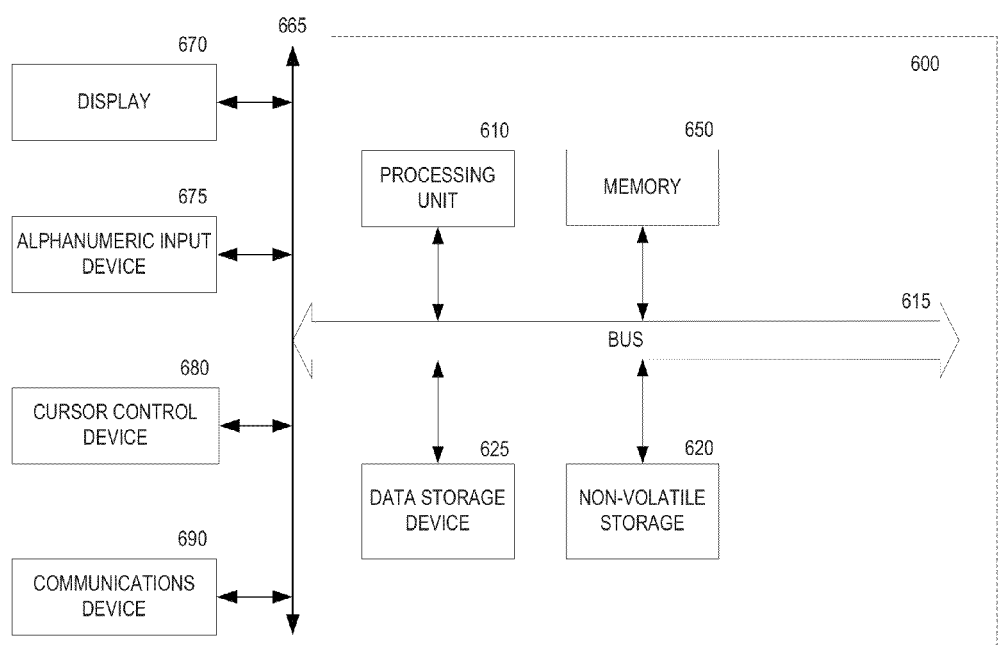
FIG. 6 is an illustration of a mobile computing device to utilize an embodiment of the invention.

FIG. 6 is an illustration of a mobile computing device to utilize an embodiment of the invention. Platform 600 as illustrated includes bus or other internal communication means 615 for communicating information, and processor 610 coupled to bus 615 for processing information. The platform further comprises random access memory (RAM) or other volatile storage device 650 (alternatively referred to herein as main memory), coupled to bus 615 for storing information and instructions to be executed by processor 610. Main memory 650 also may be used for storing temporary variables or other intermediate information during execution of instructions by processor 610. Platform 600 also comprises read only memory (ROM) and/or static storage device 620 coupled to bus 615 for storing static information and instructions for processor 610, and data storage device 625 such as a magnetic disk or optical disk and its corresponding disk drive. Data storage device 625 is coupled to bus 615 for storing information and instructions.

Platform 600 may further be coupled to display device 670, such as a cathode ray tube (CRT) or a liquid crystal display (LCD) coupled to bus 615 through bus 665 for displaying information to a computer user. Alphanumeric input device 675, including alphanumeric and other keys, may also be coupled to bus 615 through bus 665 for communicating information and command selections to processor 610. An additional user input device is cursor control device 680, such as a mouse, a trackball, stylus, or cursor direction keys coupled to bus 615 through bus 665 for communicating direction information and command selections to processor 610, and for controlling cursor movement on display device 670. In embodiments utilizing a touch-screen interface, it is understood that display 670, input device 675 and cursor control device 680 may all be integrated into a touch-screen unit.

Another device, which may optionally be coupled to platform 600, is a communication device 690 for accessing other nodes of a distributed system via a network. Communication device 690 may include any of a number of commercially available networking peripheral devices such as those used for coupling to an Ethernet, token ring, Internet, or wide area network. Communication device 690 may further be a null-modem connection, or any other mechanism that provides connectivity between computer system 600 and the outside world. Note that any or all of the components of this system illustrated in FIG. 6 and associated hardware may be used in various embodiments of the invention.

It will be appreciated by those of ordinary skill in the art that any configuration of the system illustrated in FIG. 6 may be used for various purposes according to the particular implementation. The control logic or software implementing embodiments of the invention can be stored in main memory 650, mass storage device 625, or other storage medium locally or remotely accessible to processor 610.

It will be apparent to those of ordinary skill in the art that any system, method, and process to capture media data as described herein can be implemented as software stored in main memory 650 or read only memory 620 and executed by processor 610. This control logic or software may also be resident on an article of manufacture comprising a computer readable medium having computer readable program code embodied therein and being readable the mass storage device 625 and for causing processor 610 to operate in accordance with the methods and teachings herein.

Embodiments of the invention may also be embodied in a handheld or portable device containing a subset of the computer hardware components described above. For example, the handheld device may be configured to contain only the bus 615, the processor 610, and memory 650 and/or 625. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the invention for such a device would be apparent to one of ordinary skill in the art given the disclosure of the present invention as provided herein.

Embodiments of the invention may also be embodied in a special purpose appliance including a subset of the computer hardware components described above. For example, the appliance may include processor 610, data storage device 625, bus 615, and memory 650, and only rudimentary communications mechanisms, such as a small touch-screen that permits the user to communicate in a basic manner with the device. In general, the more special-purpose the device is, the fewer of the elements need be present for the device to function.

Figure 7:
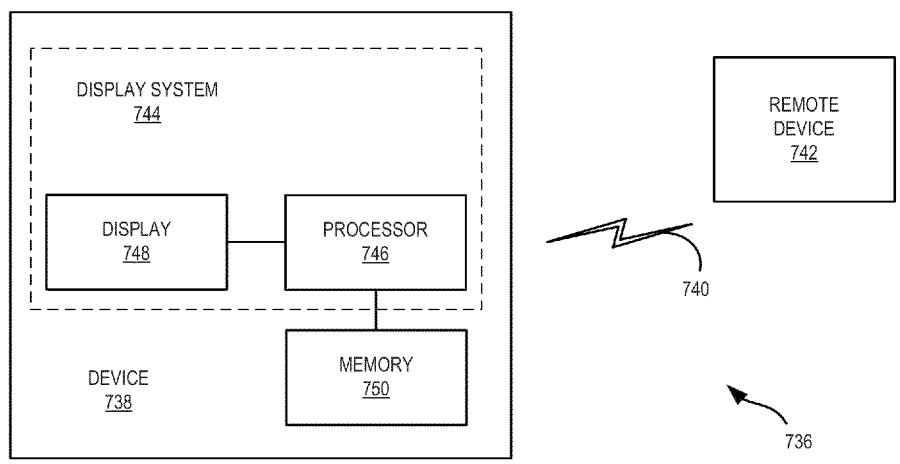
FIG. 7 illustrates an example computer network infrastructure for capturing and transmitting data according to an embodiment of the invention.

FIG. 7 illustrates an example computer network infrastructure for capturing and transmitting data according to an embodiment of the invention. In system 736, device 738 communicates using communication link 740 (e.g., a wired or wireless connection) to remote device 742. Device 738 may be any type of device that can receive data and display information corresponding to or associated with the data. For example, device 738 may be a heads-up display system, such as the eyeglasses 302 shown in FIGS. 3A and 3B.

Device 738 includes display system 744 comprising processor 746 and display 748. Display 748 may be, for example, an optical see-through display, an optical see-around display, or a video see-through display. Processor 746 may receive data from remote device 742, and configure the data for display. Processor 746 may be any type of processor, such as a micro-processor or a digital signal processor, for example.

Device 738 may further include on-board data storage, such as memory 750 coupled to processor 746. Memory 750 may store software that can be accessed and executed by processor 746, for example.

Remote device 742 may be any type of computing device or transmitter including a laptop computer, a mobile telephone, etc., that is configured to transmit data to device 738. Remote device 742 and device 738 may contain hardware to enable communication link 740, such as processors, transmitters, receivers, antennas, etc.

Communication link 740 is illustrated as a wireless connection; however, wired connections may also be used. For example, communication link 740 may be a wired link via a serial bus such as a universal serial bus or a parallel bus. A wired connection may be a proprietary connection as well. Communication link 740 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. Remote device 742 may be accessible via the Internet and may comprise a computing cluster associated with a particular web service (e.g., social-networking, photo sharing, address book, etc.) to receive captured media data as described above.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

Some portions of the detailed description above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent series of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion above, it is appreciated that throughout the description, discussions utilizing terms such as "capturing," "transmitting," "receiving," "parsing," "forming," "monitoring," "initiating," "performing," "adding," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the method operations. The required structure for a variety of these systems will appear from the description above. In addition, embodiments of the invention are not described with reference to any particular programming language. It will be appreciated that a variety of programming languages may be used to implement the teachings of the invention as described herein.

The present description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

The invention claimed is:

1. A method comprising:
in response to an event defined by a user of the mobile computing device, capturing sensor data via a sensor with a mobile computing device, the sensor data comprising a video data stream of a live view display of the mobile computing device, the video data stream including image data and audio data;
transmitting at least one of the image data or the audio data of the sensor data to a server device;
augmenting the live view display with a product identification received from the server device that identifies at least one product identified from the sensor data within the live view display;
detecting a first user gesture directed towards the product identification augmented in the live view display;
augmenting the live view display with purchase information data, received from the server device for the at least one product, in response to the first user gesture directed towards the product identification;
detecting a second user gesture directed towards the purchase information data; and
transmitting a purchase order to the server device in response to detecting the second user gesture.

2. The method of claim 1, wherein the mobile computing device comprises a user wearable computing device including a head mounted display.

3. The method of claim 2, further comprising:
    detecting a user head motion while the purchase information data for the at least one product is displayed on the head mounted display.

4. The method of claim 2, wherein the user wearable computing device comprises a head mounted gaze tracking device, the method further comprising:
    detecting the user gazing at the displayed purchase information data for the at least one product past a threshold time value.

5. The method of claim 4, wherein the sensor data includes image data identifying a plurality of items, and the method further comprises:
    transmitting gaze direction information to the server device along with the sensor data for identifying the at least one product from the sensor data based on the gaze direction information.

6. The method of claim 1, wherein the purchase information includes review information associated with the at least one product.

7. The method of claim 1, further comprising:
    transmitting the location data identifying the physical location of the mobile computing device to the server device along with the sensor data;
    wherein the received purchase information includes data identifying vendors proximate to the physical location of the mobile computing device.

8. A non-transitory computer readable storage medium including instructions that, when executed by a processor, cause the processor to perform a method comprising:
    in response to an event defined by a user of the mobile computing device, capturing sensor data via a sensor with a mobile computing device, the sensor data comprising a video data stream of a live view display of the mobile computing device, the video data stream including image data and audio data;
    transmitting at least one of the image data or the audio data of the sensor data to a server device;
    augmenting the live view display with a product identification received from the server device that identifies at least one product identified from the sensor data within the live view display;
    detecting a first user gesture directed towards the product identification augmented in the live view display;
    augmenting the live view display with purchase information data, received from the server device for the at least one product, in response to the first user gesture directed towards the product identification;
    detecting a second user gesture directed towards the purchase information data; and
    transmitting a purchase order to the server device in response to detecting the second user gesture.

9. The non-transitory computer readable storage medium of claim 8, wherein the mobile computing device comprises a user wearable computing device including a head mounted display.

10. The non-transitory computer readable storage medium of claim 9, the method further comprising:
    detecting a user head motion while the purchase information data for the at least one product is displayed on the head mounted display.

11. The non-transitory computer readable storage medium of claim 9, wherein the user wearable computing device comprises a head mounted gaze tracking device, the method further comprising:
    detecting the user gesture comprises detecting the user gazing at the displayed purchase information data for the at least one product past a threshold time value.

12. The non-transitory computer readable storage medium of claim 11, wherein the sensor data includes image data identifying a plurality of items, the method further comprising:
    transmitting gaze direction information to the server device along with the sensor data for identifying the at least one product from the sensor data based on the gaze direction information.

13. The non-transitory computer readable storage medium of claim 8, wherein the purchase information includes review information associated with the at least one product.

14. The non-transitory computer readable storage medium of claim 8, the method further comprising:
    transmitting the location data identifying the physical location of the mobile computing device to the server device along with the sensor data;
    wherein the received purchase information includes data identifying vendors proximate to the physical location of the mobile computing device.

15. The method of claim 1, further comprising:
    capturing location data identifying a physical location of the mobile computing device, wherein the user defined event is triggered when the physical location of the mobile computing device matches a location identified by the user.

* * * * *